United States Patent [19]

Imura

[11] Patent Number: 5,223,943
[45] Date of Patent: Jun. 29, 1993

[54] STILL-VIDEO SIGNAL PLAYBACK APPARATUS WITH PLURAL SYSTEM DEMODULATOR AND LOW PASS FILTER SELECTION AND DELAY COMPENSATION

[75] Inventor: Hisafumi Imura, Tokyo, Japan

[73] Assignee: Fuji Photo Film Co., Ltd., Minami-Ashigara, Japan

[21] Appl. No.: 413,821

[22] Filed: Sep. 26, 1989

[30] Foreign Application Priority Data

Sep. 28, 1988 [JP] Japan ................. 63-240862

[51] Int. Cl.⁵ .................. H04N 9/80; H04N 9/89
[52] U.S. Cl. .................. 358/320; 358/327; 358/330; 360/36.1
[58] Field of Search .............. 358/315-316, 358/320, 327, 329, 330, 337, 339, 342, 906, 909, 323-326; 360/35.1, 36.1-36.2

[56] References Cited

U.S. PATENT DOCUMENTS

| 4,760,468 | 7/1988 | Nakano et al. | 358/320 X |
| 4,761,691 | 8/1988 | Stearns | 358/320 X |
| 4,764,812 | 8/1988 | Hamley | 358/320 X |
| 4,774,594 | 9/1988 | Urata | 358/320 |
| 4,980,779 | 12/1990 | Sakata | 358/320 X |

Primary Examiner—W. R. Young

[57] ABSTRACT

A charge transfer element is utilized and the frequency of clock pulses applied to the charge transfer element is adjusted to compensate for the amount of delay of a luminance signal, which differs from one recording system to another, and a difference in amounts of delay between the luminance signal and a color signal.

2 Claims, 2 Drawing Sheets

STILL-VIDEO SIGNAL PLAYBACK APPARATUS WITH PLURAL SYSTEM DEMODULATOR AND LOW PASS FILTER SELECTION AND DELAY COMPENSATION

BACKGROUND OF THE INVENTION

1. Field of the Invention

This invention relates to a playback apparatus which can be used for playing back at least two-types of frequency-modulated signals recorded on a recording medium by different recording systems. More particularly, the invention relates to a playback apparatus for still-video signals recorded on a magnetic floppy disk.

2. Description of the Prior Art

Recording systems for recording still-video signals on a high-density magnetic floppy disk by an electronic still camera (still-video camera) or other recording apparatuses, are of two types, namely a normal-band recording system and a high-band recording system.

A still-video signal comprises a luminance signal (Y signal) and a color signal (C signal) (in general, color difference signals R-Y and B-Y). In the normal-band mode, a carrier wave having a center frequency of 7 MHz is frequency modulated by the luminance signal Y (this frequency-modulated wave is called a "Y-RF signal" for short), carrier waves having frequencies of 1.2 MHz and 1.3 MHz are frequency modulated by the color difference signals R-Y, B-Y, respectively (these frequency-modulated waves are called "C-RF signals" for short), and the Y-RF, C-RF signals are mixed and recorded on the track of a video floppy. The frequency of the sync tip of the Y-RF signal is 6 MHz, the frequency of the white peak is 7.5 MHz, and the frequency deviation is 1.5 MHz.

In the high-band recording system for recording high-resolution still-video signals, the center frequency of the carrier wave for frequency modulation of the luminance signal Y is set at 9 MHz. The sync tip frequency of the Y-RF signal in the high-band recording frequency is 7.7 MHz, the white peak frequency is 9.7 MHz, and the frequency deviation is 2 MHz. The C-RF signal is the same as in the case of the normal band.

When the recording system of a still-video signal differs from another, the playback system also differs, particularly the construction of the frequency demodulator circuit and its peripheral circuitry. Accordingly, in a playback apparatus usable for both the normal band and high band, two Y-RF signal demodulator circuits are provided, one for the normal-band system and one for the high-band system. Also, with regard to low-pass filters connected in back of these demodulator circuits in order to remove the carrier wave components, filters having different cut-off frequencies will be required since the frequencies of the carrier-wave signals will not be the same for both the normal-band recording system and high-band recording system.

However, since filters having different cut-off frequencies possess different amounts of delay, the amounts by which the signals passing through the filters are delayed will not be the same for both the normal-band recording system and high-band recording system.

The C-RF signal likewise is demodulated by using demodulator circuits and low-pass filter circuits, and these circuits also possess their own signal delays. Since it is required that the luminance signal and color signal be in synchronism after demodulation, the conventional practice is to provide a delay circuit in conformity with the difference in the amounts of delay of the luminance and color signals. However, since the amount of delay of the luminance signal differs depending upon the recording system, synchronization measures in conformance with the recording system are also required.

Further, the color signal is formed by line-sequencing the color difference signals R-Y and B-Y. This means that color signal playback requires a synchronizing circuit, and the playback apparatus is provided with a circuit for this purpose. Moreover, the playback apparatus is provided with a comb filter for improving the color represented by the outputted color difference signal. However, the synchronizing circuit and comb filter possess characteristics that delay the signal passing through the respective circuit elements, so that the color signal which has passed through the circuit elements is delayed in comparison with the luminance signal in 1 H of time (where H is one horizontal scanning interval). Consequently, these circumstances must be taken into consideration for the sake of color signal and luminance signal synchronization.

SUMMARY OF THE INVENTION

An object of the present invention is to compensate for differences in the amounts of delay peculiar to individual circuits in a playback apparatus used to play back plural types of video signals recorded in a plurality of different recording systems.

According to a first embodiment of the invention, a playback apparatus is used to play back plural types of video signals recorded on a recording medium by a different recording system. Here recording systems of a plurality of different types frequency-modulate a luminance signal and color signal, which constitute a video signal, in each recording system by using carrier waves having different respective frequencies, and perform frequency modulation at least with regard to the luminance signal using carrier waves each having a different frequency for every recording system.

The playback apparatus according to the first aspect of the invention comprises a reading head for reading a frequency-modulated video signal from a recording medium, a separator circuit for separating the frequency-modulated video signal read by the reading head into a luminance signal component and a color signal component, a first demodulator circuit for demodulating the color signal component separated by the separator circuit, a plurality of second demodulator circuits provided for each recording system for demodulating the luminance signal component separated by the separator circuit, selecting means for selecting the plurality of second demodulator circuits in dependence upon the recording system, a charge transfer element for delaying, in conformity with the frequency of a given clock signal, an output luminance signal of a second demodulator circuit selected by the selecting means, and clock signal generating means for generating a clock signal of a frequency which determines an amount of delay of the charge transfer element, in conformity with the selection made by the selecting means, so as to compensate for a difference between an amount of delay of the luminance signal demodulated by the selected second demodulator circuit and an amount of delay of the color signal demodulated by the first demodulator circuit.

Thus, the charge transfer element for delaying the demodulated luminance signal is provided, as well as the clock signal generating means which controls the amount of delay of the charge transfer element in dependence upon the recording system selected by the selecting means. This makes it possible to correctly synchronize the luminance signal and color signal for recording systems of a plurality of types.

In a second aspect of the present invention, there is provided a playback apparatus for playing back video signals recorded by a plurality of types of recording systems for frequency modulating, and storing on a recording medium, a video signal using carrier waves of different frequencies, characterized by comprising a reading head for reading a frequency-modulated video signal from the recording medium, demodulator circuits, the number of which correspond to the number of recording systems in which playback is possible, for demodulating the frequency-modulated video signal read by the reading head, and a delay circuit connected to whichever of the demodulator circuits has a small amount of delay so as to compensate for a difference in amounts of delay of the plurality of demodulator circuits.

Thus, according to the second aspect of the invention, the demodulator circuit having the small amount of delay is provided with a delay circuit for delaying the demodulated luminance signal in dependence upon the amount of delay of the video signal demodulated by each demodulator circuit. Accordingly, even if the amount of delay peculiar to the playback circuit differs from one recording system to another, a video signal having a constant delay time can always be obtained.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
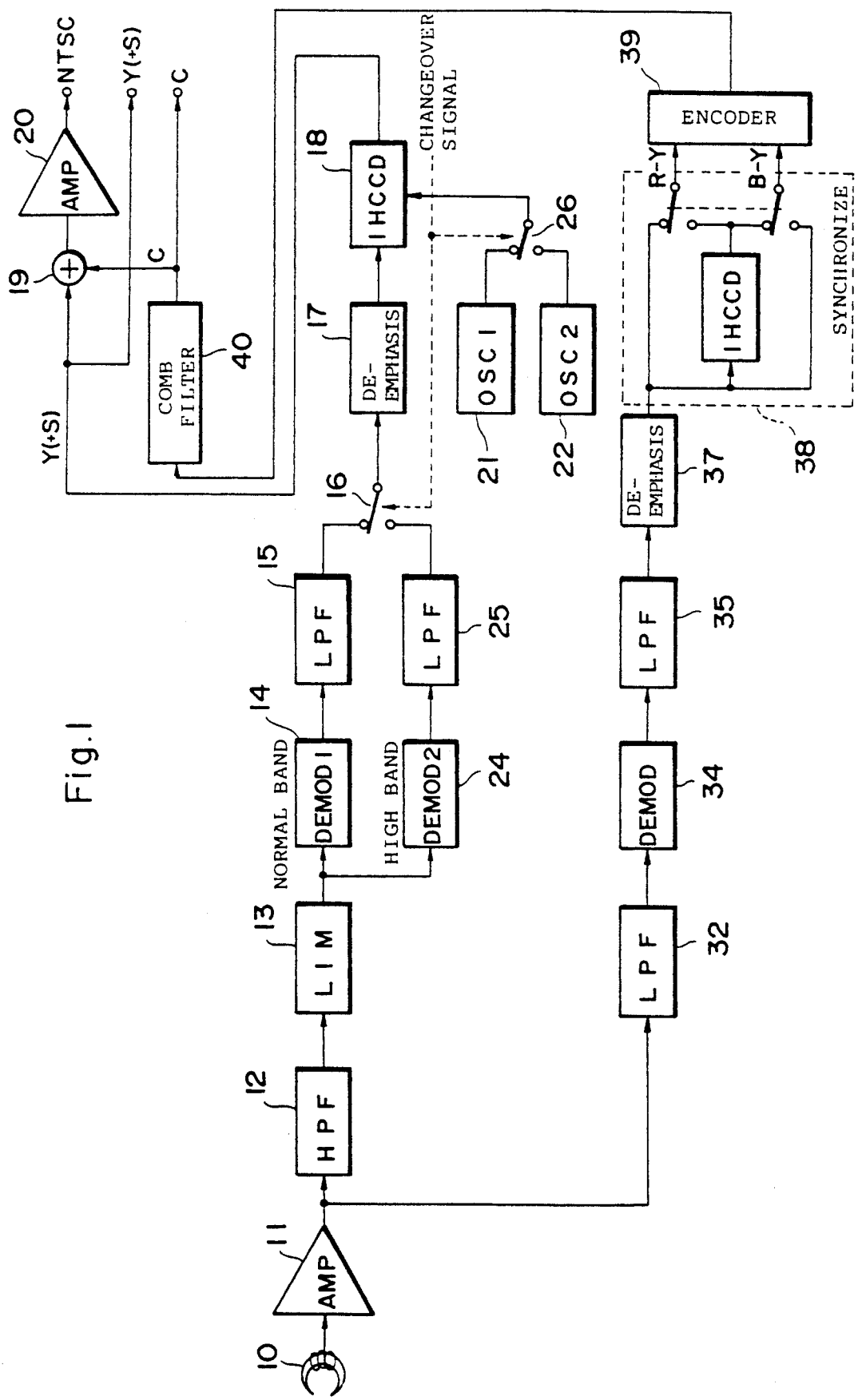
FIG. 1 is a block diagram illustrating a first embodiment of the present invention.

FIG. 1 is a block diagram illustrating a first embodiment in which the present invention is applied to a still-video signal playback apparatus.

A still-video signal (RF signal) recorded on a magnetic video floppy (magnetic recording medium) (not shown) upon being frequency modulated is read by a magnetic head 10 and then amplified by a head amplifier 11. The amplified playback RF signal passes through a high-pass filter 12 by which only a Y-RF signal is extracted and fed into a limiter 13. The playback RF signal is also applied to a low-pass filter 32 whereby only a C-RF signal is extracted.

The Y-RF signal whose amplitude has been limited by the limiter 13 enters a first frequency-modulator circuit 14 and a second frequency-modulator circuit 24. The first frequency-modulator circuit 14 is a demodulator circuit for a normal-band recording system, and the second frequency-modulator circuit 24 is a demodulator circuit for a high-band recording system. The demodulated signals outputted by these demodulator circuits 14, 24 are respectively applied to a first low-pass filter 15 and a second low-pass filter 25 to remove the carrier-wave signal components therefrom.

Since the frequency of the carrier-wave signal in the normal-band recording system is lower than that of the carrier-wave signal in the high-band recording system, the cut-off frequency (4 MHz) of the first low-pass filter 15 is set to be lower than that (6.5 MHz) of the second low-pass filter 25. Consequently, the amount of delay of the first low-pass filter 15 is greater than that of the second low-pass filter 25.

The signals that pass through the low-pass filters 15 and 25 are applied to a changeover circuit 16. The latter has a switching circuit for changing over between the set of circuits 14, 15 and the set of circuits 24, 25 in dependence upon recording system discrimination information (a changeover signal) indicating whether the recording system is the normal-band or high-band system. In case of the normal-band recording system, the demodulator circuit 14 and low-pass filter 15 are selected and the resulting output signal is fed into a de-emphasis circuit 17. In case of the high-band recording system, the demodulator circuit 24 and low-pass filter 25 are selected and the resulting output signal is fed into the de-emphasis circuit 17. Thus, the signal demodulated properly in conformity with the particular recording system is applied to the de-emphasis circuit 17 to have its high-frequency components attenuated.

The de-emphasis circuit 17 outputs a luminance signal Y applied to a charge transfer element (CCD) 18 which delays the input signal a prescribed period of time in dependence upon a clock signal. Connected to the charge transfer element 18 via a changeover circuit 26 are a clock generator 21 of a first frequency and a clock generator 22 of a second frequency which generate clock signals that control the charge transfer of the element 18. The changeover circuit 26 also has a switching circuit for effecting changingover in dependence upon the aforementioned recording system discrimination information (changeover signal). In case of the normal-band recording system, the first clock generator 21 is selected and its output clock signal is applied to the element 18. In case of the high-band recording system, the second clock generator 22 is selected and its output clock signal is applied to the element 18.

Meanwhile, the C-RF signal separated by the low-pass filter 32 is applied to a frequency-demodulator circuit 34 to be demodulated, after which the signal is fed into a low-pass filter 35 to have the carrier-wave signal component removed. The resulting signal enters a de-emphasis circuit 37, where processing for attenuation of high-frequency components is carried out.

The cut-off frequency of the low-pass filter 35 is much lower than the cut-off frequencies of the low-pass filters 15, 25, the amount of delay is much greater than the amounts of delay of the filters 15, 25. The low-pass filter 32 also possesses a certain amount of delay.

The color signal is composed of the line-sequenced color difference signals R-Y and B-Y. Accordingly, the output signal of the de-emphasis circuit 37 is applied to a synchronizing circuit 38 which includes a 1 H delay CCD and a changeover switch changed over every 1 H. The color signals R-Y, B-Y are obtained, in synchronized form, from the synchronizing circuit 38. These color signals R-Y, B-Y are applied to an encoder 39 to be encoded, whereby a color signal C is obtained. The color signal C is applied to a comb filter 40 for the purpose of color enhancement.

The output luminance signal Y (including the synchronizing signal S) from the charge transfer element 18 and the output color signal C from the comb filter 40 are mixed by an adder circuit 19, the output of which is amplified by an amplifier 20 to obtain an output signal in the form of a video signal conforming to the NTSC format. If necessary, the luminance signal Y and color signal C may be outputted as they are, or the color signal can be outputted upon being converted into R, G and B color-component signals.

By being passed through the synchronizing circuit 38 and comb filter 40, the color signal C lags 1 H behind the luminance signal Y. It is required that luminance signal Y and color signal C eventually obtained be in synchronism. In order to obtain synchronism between the two signals Y and C, the charge transfer element 18, which has an amount of delay of approximately 1 H, is provided for the purpose of delaying the luminance signal Y.

What also must be considered is that the amounts of delay possessed by the low-pass filters 15, 25 differ, and that one of these filters 15, 25 is connected into the circuitry, depending upon the recording system. Furthermore, the amount of delay of the low-pass filter 15 or 25 for the luminance signal and the sum of the delays of the low-pass filters 32, 35 for the color signal differ.

In consideration of these factors, the clock frequencies of the clock generators 21, 22 are set so as to obtain the charge transfer element delay set forth hereinbelow.

In the case of the normal-band recording system, the first clock generator 21 is connected to the charge transfer element 18. In such case, the amount of delay possessed by the charge transfer element 18 is decided in such a manner that coincidence will be achieved between the sum total of the amounts of delay relating to the luminance signal demodulator circuitry, which include the amount of delay of the low-pass filter 15 and the amount of delay of the charge transfer element 18, and the sum total of the amounts of delay relating to the color signal demodulator circuitry, which include the amounts of delay of the low-pass filters 32, 35, the amount of delay of the synchronizing circuit 38 and the amount of delay of the comb filter 40, and clock pulses of a frequency that will produce this amount of delay in the charge transfer element 18 are generated by the first clock generator 21.

In the case of the high-band recording system, the second clock generator 22 is connected to the charge transfer element 18. In such case, the amount of delay possessed by the charge transfer element 18 is decided in such a manner that coincidence will be achieved between the sum total of the amounts of delay relating to the luminance signal demodulator circuitry, which include the amount of delay of the low-pass filter 25 and the amount of delay of the charge transfer element 18, and the sum total of the amounts of delay relating to the color signal demodulator circuitry, which include the amounts of delay of the low-pass filters 32, 35, the amount of delay of the synchronizing circuit 38 and the amount of delay of the comb filter 40, and clock pulses of a frequency that will produce this amount of delay in the charge transfer element 18 are generated by the second clock generator 22.

Thus, in conformity with the clock signal applied to the charge transfer element 18, a time-wise deviation between the luminance signal and color signal, and a time-wise deviation due to a difference between recording systems, such as a difference between a normal-band recording system and a high-band recording system, are compensated for at one stroke so that the proper video signal can be obtained.

Figure 2:
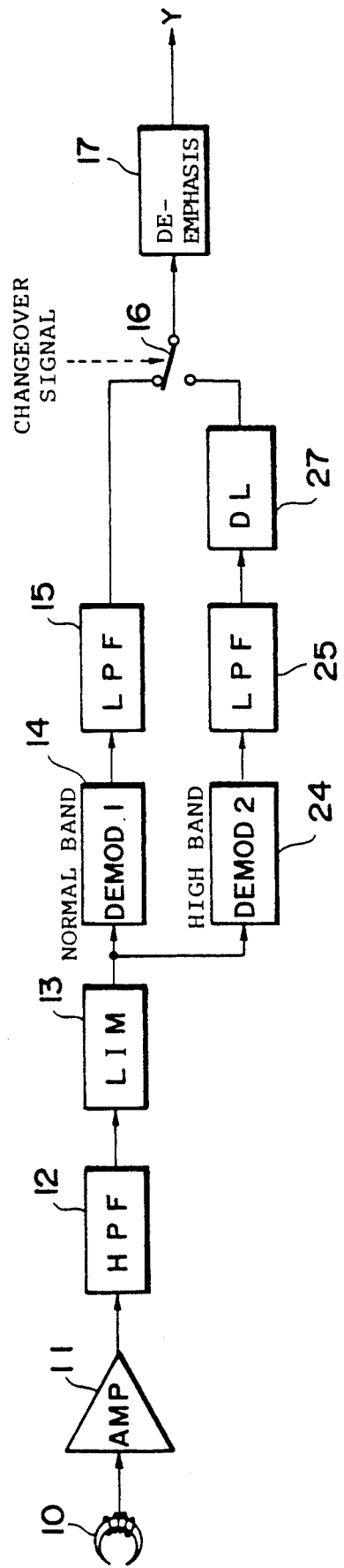
FIG. 2 is a block diagram illustrating a second embodiment of the present invention.

FIG. 2 illustrates a second embodiment in which a compensation is made for a difference between amounts of delay in a normal-band recording system and high-band recording system. Portions in this embodiment identical with those of FIG. 1 are designated by like reference characters and need not be described again.

As mentioned above, the first low-pass filter 15 has a larger amount of delay than the second low-pass filter 25. In order to bring these two amounts of delay into conformity, a delay circuit 27, which possesses an amount of delay corresponding to the difference in amount of delay between the filter circuits 15, 25, is connected to the second low-pass filter 25. As a result of this expedient, the amount of delay applied to the luminance signal can be rendered constant irrespective of a disparity in amount of delay based on a difference between recording systems, such as a difference between a normal-band recording system and a high-band recording system.

As many apparently widely different embodiments of the present invention can be made without departing from the spirit and scope thereof, it is to be understood that the invention is not limited to the specific embodiments thereof except as defined in the appended claims.

What is claimed is:

1. A frequency-modulated video signal playback apparatus which is used to play back plural types of video signals recorded on a recording medium by a plurality of different types of recording systems, in which a luminance signal and color signal constituting a video signal have been frequency-modulated in each recording system using carrier waves having different respective frequencies, and in which frequency modulation has been applied at least with regard to the luminance signal using carrier waves having frequencies that differ for each recording system, said playback apparatus comprising:

a reading head for reading a frequency-modulated video signal from a recording medium;

a separator circuit for separating the frequency-modulated video signal read by said reading head into a luminance signal component and a color signal component;

a first demodulator circuit for demodulating the color signal component separated by said separator circuit;

a plurality of second demodulator circuits provided for each recording system for demodulating the luminance signal component separated by said separator circuit;

a plurality of low-pass filters which are fed the demodulated luminance signals from the corresponding second demodulator circuits, said low-pass filters removing carrier wave components from the luminance signals;

selecting means for selecting one pair, said pair including a second demodulator circuit and a low-pass filter, in dependence upon the recording system;

a charge transfer element for delaying, in conformity with the frequency of a given clock signal, a luminance signal outputted from a pair of a second demodulator circuit and a low pass filter selected by said selecting means; and clock signal generating means for generating a clock signal of a frequency which determines an amount of delay of said charge transfer element, in conformity with the selection made by said selecting means, so as to compensate for a difference between an amount of delay of the luminance signal outputted from said selected pair of the second demodulator circuit and the low-pass filter and an amount of delay of the color signal demodulated by said first demodulator circuit.

2. A playback apparatus for playing back video signals recorded by a plurality of types of recording systems for frequency modulating, and storing on a record medium, a video signal using carrier waves of different frequencies, comprising:

a reading head for reading a frequency-modulated video signal from the recording medium;

demodulator circuits, the number of which correspond to the number of recording systems, each of the demodulating circuits demodulating a frequency-modulated luminance signal read by said reading head;

a plurality of low pass filters which are fed the demodulated luminance signals from each of the demodulator circuits, said low pass filters removing the carrier wave components from the luminance signals;

a delay circuit connected to whichever of said low pass filters has a smaller amount of delay so as to compensate for a difference in amounts of delay of said plurality of low pass filters; and selecting means for selecting one pair, said pair including a low pass filter and a demodulator circuit.

* * * * *